(12) United States Patent
Figl

(10) Patent No.: US 7,806,111 B2
(45) Date of Patent: Oct. 5, 2010

(54) INTERNAL COMBUSTION ENGINE

(76) Inventor: Gerhard Figl, Hubertusgasse 8, Tulln an der Donau (AT) A-3430

( * ) Notice: Subject to any disclaimer, the term of this patent is extended or adjusted under 35 U.S.C. 154(b) by 89 days.

(21) Appl. No.: 12/345,613

(22) Filed: Dec. 29, 2008

(65) Prior Publication Data
US 2009/0173322 A1 Jul. 9, 2009

Related U.S. Application Data

(63) Continuation of application No. PCT/AT2007/000283, filed on Jun. 12, 2007.

(30) Foreign Application Priority Data
Jun. 28, 2006 (AT) .............................. A 1086/2006

(51) Int. Cl.
*F02B 51/02* (2006.01)
*F02F 1/14* (2006.01)
(52) U.S. Cl. .................... 123/670; 123/41.79; 123/668; 123/657; 123/272; 123/41.52
(58) Field of Classification Search ................. 123/1 A, 123/2, 3, DIG. 12, 197.1, 197.2, 197.3, 41.52, 123/41.2, 272, 672; 29/888.06, 888.061
See application file for complete search history.

(56) References Cited

U.S. PATENT DOCUMENTS 4,185,593 A * 1/1980 McClure ..................... 123/1 A
4,318,369 A * 3/1982 Cronyn .......................... 123/3
4,805,571 A * 2/1989 Humphrey ................... 123/316
5,085,176 A * 2/1992 Brinkley, III .................... 123/3

FOREIGN PATENT DOCUMENTS

| CN | 1 229 878 | 9/1999 |
| CN | 1 952 362 | 4/2007 |
| DE | 85 04 780 | 8/1985 |
| JP | 05 086966 | 4/1993 |

* cited by examiner

*Primary Examiner*—Michael Cuff
*Assistant Examiner*—Hung Q Nguyen
(74) *Attorney, Agent, or Firm*—Cohen Pontani Lieberman & Pavane LLP

(57) ABSTRACT

An internal combustion engine having at least one piston cylinder comprising a housing enclosing twin gas injectors and having two inlet openings for separate supply of hydrogen gas and oxygen gas to a combustion chamber of the piston cylinder, two pressure-controlled and time-controlled, electrical inlet valves and associated nozzle needles coupled to the housing, wherein the combustion chamber has an outlet opening for ejection of a combustion product, and a thermolysis catalyst covering the combustion chamber. The thermolysis catalyst includes two hollow cylinders arranged at a distance from one another and concentrically and surrounding an intermediate space. The walls of the hollow cylinders defining the intermediate space have a metal coating for release of the heat of combustion acting on the inner hollow cylinder. The outer hollow cylinder includes an inlet opening for the supply of water, an outlet opening for the release of oxyhydrogen gas and a temperature sensor for control of water supply.

7 Claims, 3 Drawing Sheets

INTERNAL COMBUSTION ENGINE

RELATED APPLICATIONS

This application is a continuation of International Application PCT/AT2007/000283 filed Jun. 12, 2007. This application claims the priority of Austrian patent application no. A 1086/2006 filed Jun. 28, 2006, the content of which is hereby incorporated by reference.

FIELD OF THE INVENTION

The invention relates to an internal combustion engine having at least one piston cylinder.

BACKGROUND OF THE INVENTION

In internal combustion engines, pollutants, such as for example nitrogen oxide ($NO_x$), carbon dioxide ($CO_2$), soot or dust particles, which put a strain on the environment, are produced due to the combustion of fossil, biological, solid or gaseous energy carriers in the combustion chamber of the cylinder.

SUMMARY OF THE INVENTION

One object of the invention is to avoid the above-described pollutants and to provide an internal combustion engine the operation of which is as environmentally friendly as possible.

This and other objects are attained in accordance with one aspect of the invention directed to an internal combustion engine having a housing enclosing twin gas injectors and having two inlet openings for separate supply of hydrogen gas and oxygen gas to the combustion chamber of the piston cylinder, wherein the housing is provided with two pressure-controlled and time-controlled, electrical inlet valves and assigned nozzle needles, in that the combustion chamber has an outlet opening for ejection of the combustion product, and in that a thermolysis catalyst forms the combustion chamber covering, which thermolysis catalyst has two hollow cylinders arranged at a distance from one another and concentrically and surrounding an intermediate space, wherein the walls of the hollow cylinders defining the intermediate space are provided with a metal coating for release of the heat of combustion acting on the inner hollow cylinder, and wherein the outer hollow cylinder is provided with an inlet opening for the supply of water, an outlet opening for the release of oxyhydrogen gas and a temperature sensor for control of water supply.

The outlet opening of the combustion chamber can preferably be closed by a spring valve controlled by a double-acting camshaft.

The two inlet valves of the housing can comprise in each case a coil, an anchor and a compression spring.

The spring valve can be opened at about 160 degrees in the piston positions from the bottom dead center to shortly before the upper dead center.

BRIEF DESCRIPTION OF THE DRAWINGS

The invention is illustrated in more detail below using an exemplary embodiment with reference to the drawings.

DETAILED DESCRIPTION OF THE DRAWINGS

Figure 1:
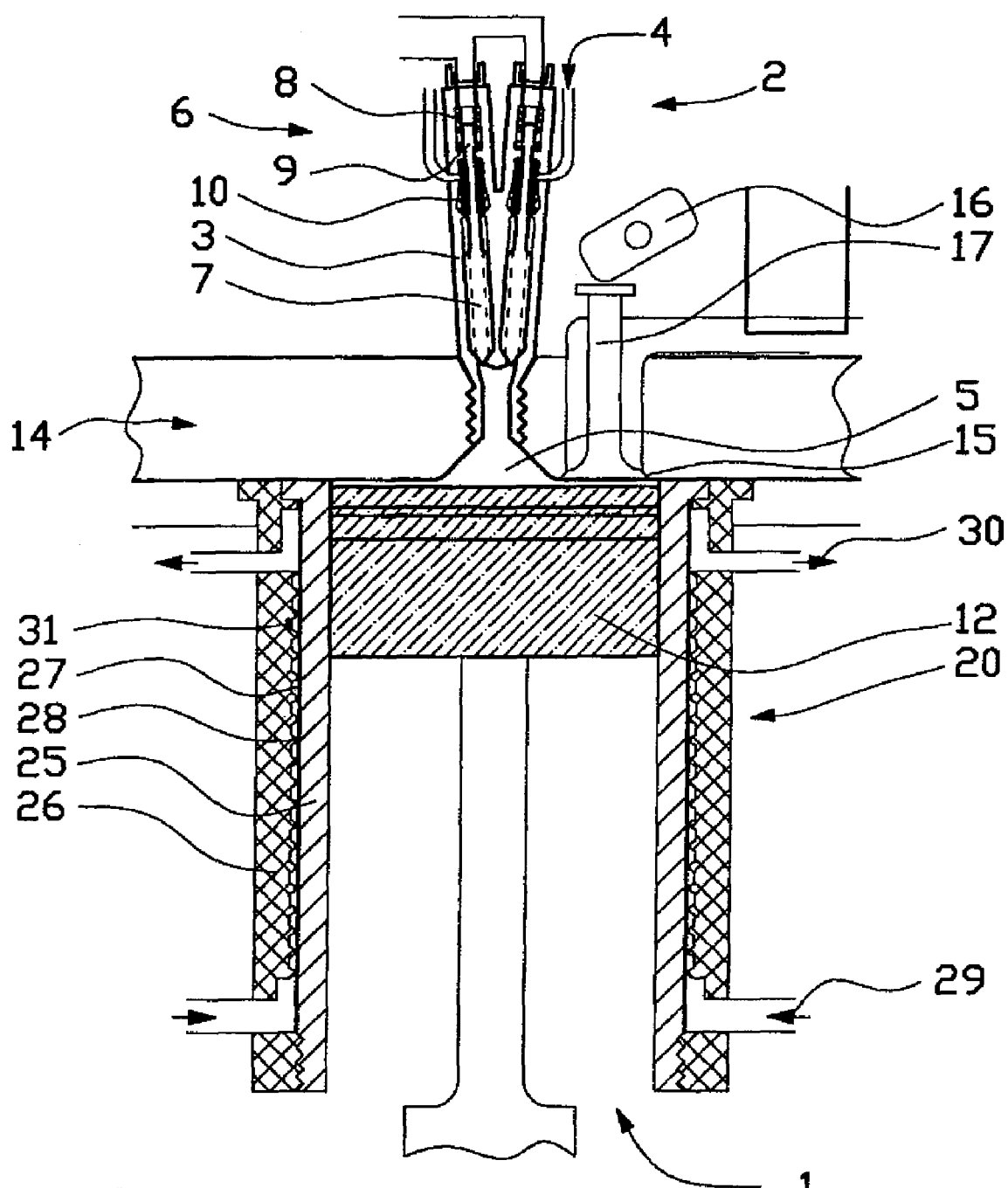
FIG. 1 shows a schematic sectional representation of a part of the internal combustion engine having twin gas injectors and a thermolysis catalyst.
Figure 2:
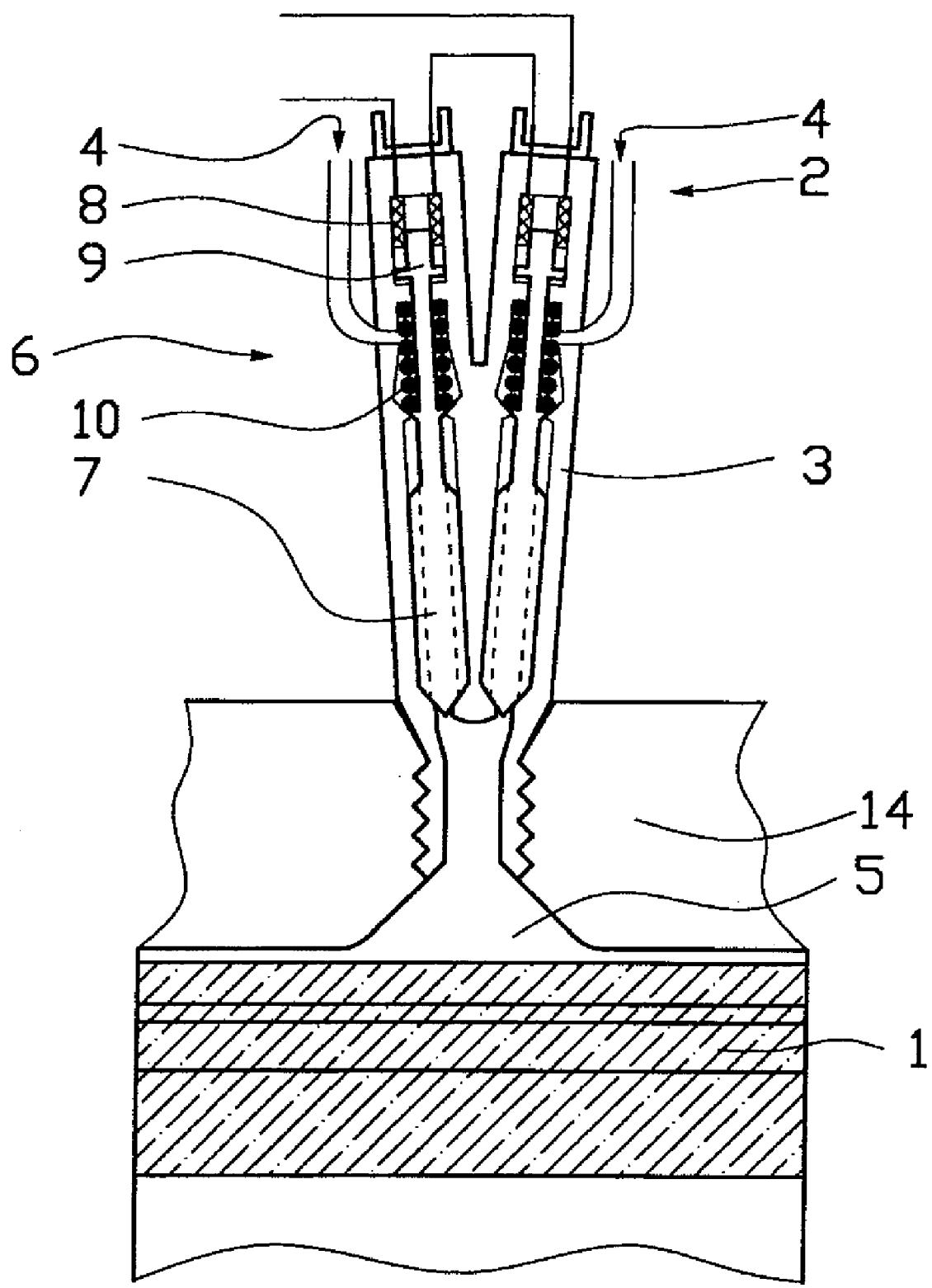
FIG. 2 shows schematically in detail the twin gas injectors.

According to FIGS. 1 and 2, the internal combustion engine has at least one piston cylinder 1 and a housing 3. Housing 3 encloses twin gas injectors 2 and has two inlet openings 4 for the separate supply to the combustion chamber 5 of the energy carriers hydrogen gas ($H_2$) and oxygen gas ($O_2$) in the ratio of 2:1. Two gas pressure-controlled and time-controlled, electrical inlet valves 6 control the supply of the energy carriers via two nozzle needles 7 arranged in the housing 3 at a distance of D from each other which is set precisely according to operating requirements. The two inlet valves 6 comprise in each case a coil 8, an anchor 9 and a compression spring 10. Gas injectors 2 with inlet valves 6 are readily available, well known components and, thus, further details are not deemed needed.

The internal combustion engine of the invention does not have an air-inlet opening, since an air supply is not necessary for the reaction of the oxygen gas with the hydrogen gas.

Figure 3:
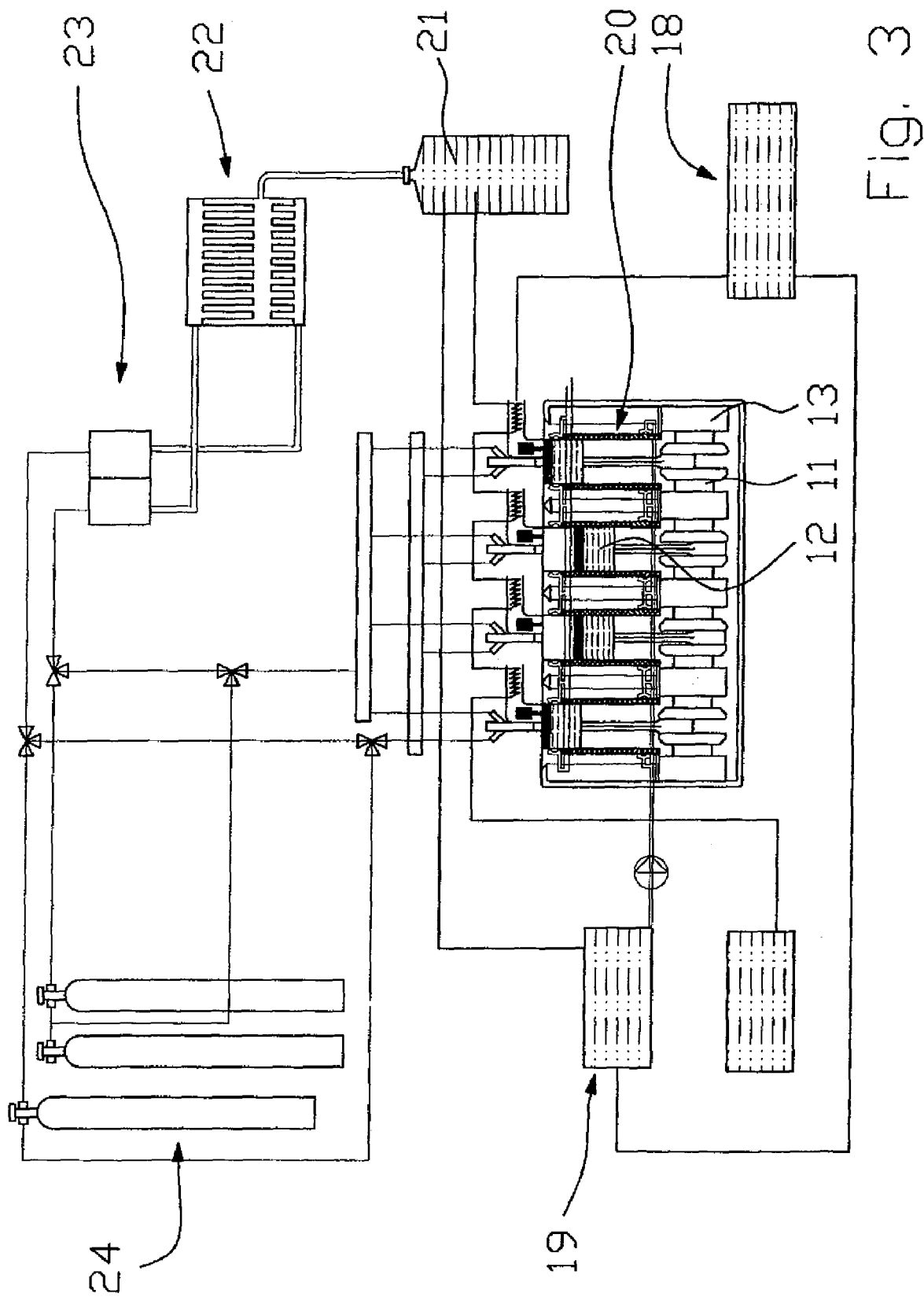
FIG. 3 shows a schematic representation of a complete internal combustion engine.

Since the internal combustion engine has no momentum when it is started up, the crankshaft 11 shown in FIG. 3 is initially driven via an electrical starter (not shown). At a piston position shortly before the upper dead center, the twin gas injectors 2 are opened for a time period in the millisecond range in order to introduce hydrogen gas and oxygen gas into the combustion chamber 5 of the cylinder 1. In the cold-start phase, the hydrogen-oxygen gas mixture introduced in the ratio 2:1 (oxyhydrogen gas) is combusted by spark ignition, for example by an ignition spark or a spark plug (not shown). After reaching a constant combustion chamber temperature of about 700 degrees C., the spark ignition is switched off and the auto-ignition adapted to a predetermined piston position. In the subsequent working cycle, the gas mixture burns at a temperature up to 3,000 degrees C. and produces water molecules, wherein the resulting pressure increase and volume increase of the gas mixture moves the piston 12 to the bottom dead center of the cylinder 1. The working load 13 associated with the crankshaft 11 guides the piston 12 to the upper dead center, wherein at the piston positions from the bottom dead center to shortly before the upper dead center at about 160 degrees, an outlet opening 15 arranged in the cylinder head 14 is opened by means of a spring valve 17 controlled by a double-acting camshaft 16, and the water molecules are passed from combustion chamber 5 via heat exchanger HE to an exhaust gas water tank 18. The heat exchanger HE receives water from tank T. The water molecules collected in the exhaust gas water tank 18 are passed to a pure-water tank 19 and then supplied via pump P to a thermolysis catalyst 20 forming the covering of the combustion chamber of the internal combustion engine. The thermolysis catalyst 20 decomposes the water molecules thermally into hydrogen gas and oxygen gas. The gas mixture which is thusly formed is passed to a cooling-water device 21, as a result of which water vapour which is present to a small extent condenses to form water which is collected in tank 19. Then the pure hydrogen/oxygen gas mixture is supplied from device 21 to a gas-separation device 22, which separates the hydrogen gas from the oxygen gas. Then the separated gases are compressed in a high-pressure compressor 23 and stored in storage devices 24 to be supplied again to the internal combustion engine as energy carriers.

The thermolysis catalyst 20 has two concentric hollow cylinders 25 and 26 arranged at a distance from one another of preferably 1 to 2 mm, and which enclose an intermediate space 27 that is provided with a metal coating 28 made of preferably platinum, palladium, iridium, osmium, rhodium or the like. The outer hollow cylinder 26 is provided with a radially extending inlet opening 29 close to its bottom for the supply of water, and a radially extending outlet opening 30 close to its top for the release of oxyhydrogen gas to the cooling-water device 21. The heat produced due to the combustion of the energy carriers in the combustion chamber 5 of the inner hollow cylinder 25, in the case of a metal coating 28 formed from platinum of the inner hollow cylinder 25, heats the latter to a temperature of about 1,200° C. and puts it into an ignition state. The water flowing via the inlet opening 29 into the intermediate space 27 is transformed by the strongly heated hollow cylinders 25 and 26 directly into super-heated water vapour ($2H_2O$). Due to the interaction of the water vapour with the platinum coating 28, the super-heated water vapour molecules in the oxyhydrogen gas ($2H_2+O_2$) are thermally decomposed into a mixture of gaseous hydrogen ($2H_2$) and oxygen ($O_2$) in the volume ratio H:O=2:1. Responsive to a signal from a temperature sensor 31 arranged before the outlet opening 30, the pump P is controlled to provide a water supply from tank 19 such that the super-heated water vapour produced keeps the temperature of the glowing platinum coating 28 constant at an ideal temperature of about 1,200° C.

The internal combustion engine of the invention may be operated in four-stroke cycle and in two-stroke cycle, since a separate intake stroke and compression stroke are not necessary. The advance angle per cylinder may therefore be switched in running operation from 720 degrees to 360 degrees, as a result of which an increase in power of the internal combustion engine without delay is possible.

The advantage of the invention is that no pollutants are produced, such as for example nitrogen oxide ($NO_x$), carbon dioxide ($CO_2$), soot or dust particles, hence the environment is not strained.

It goes without saying that the embodiment described may be modified several times within the framework of the general inventive concept. For example a rotary piston engine may be provided as the internal combustion engine.

I claim:

1. An internal combustion engine having at least one piston cylinder comprising:

a housing enclosing twin gas injectors and having two inlet openings for separate supply of hydrogen gas and oxygen gas to a combustion chamber of the piston cylinder, and two inlet valves and associated nozzle needles, wherein the combustion chamber has an outlet opening for ejection of a combustion product;

a thermolysis catalyst covering the combustion chamber, which thermolysis catalyst includes two hollow cylinders arranged at a distance from one another and concentrically and surrounding an intermediate space, wherein the walls of the hollow cylinders defining the intermediate space have a metal coating for release of the heat of combustion acting on the inner hollow cylinder; and wherein the outer hollow cylinder includes an inlet opening for the supply of water, an outlet opening for the release of oxyhydrogen gas, and a temperature sensor for control of water supply.

2. The internal combustion engine according to claim 1, wherein the outlet opening of the combustion chamber is adapted to be closed by a spring valve controlled by a double-acting camshaft.

3. The internal combustion engine according to claim 1, wherein each of the inlet valves of the housing comprises a coil, an anchor and a compression spring.

4. The internal combustion engine according to claim 1, wherein the spring valve is adapted to be opened at about 160 degrees in the piston positions from the bottom dead center to shortly before the upper dead center.

5. The internal combustion engine according to claim 1, wherein the internal combustion engine is adapted to be free of air-inlet openings.

6. The internal combustion engine according to claim 1, wherein the internal combustion engine is adapted for operation in four-stroke cycle or two-stroke cycle with an advance angle of 720 degrees or 320 degrees per cylinder.

7. The internal combustion engine according to claim 1, wherein each of the inlet valves comprises a pressure-controlled and time-controlled, electrical inlet valve.

* * * * *